United States Patent

Uhm

[19]

[11] Patent Number: 5,830,328
[45] Date of Patent: Nov. 3, 1998

[54] CONTAMINATION CONTROL OF EMISSION DISCHARGE

[75] Inventor: Han S. Uhm, Potomac, Md.

[73] Assignee: The United States of America as represented by the Secretary of the Navy, Washington, D.C.

[21] Appl. No.: 669,687

[22] Filed: Jun. 24, 1996

[51] Int. Cl.⁶ .................................................. B01D 53/34
[52] U.S. Cl. ...................... 204/164; 204/157.3; 588/210; 588/219; 588/222
[58] Field of Search ................................ 204/164, 157.3; 588/210, 219, 222

[56] References Cited

U.S. PATENT DOCUMENTS

| | | | |
|---|---|---|---|
| 5,137,701 | 8/1992 | Mundt | 204/157.3 |
| 5,468,356 | 11/1995 | Uhm | 204/164 |
| 5,505,909 | 4/1996 | Dummersdorf et al. | 588/210 |

*Primary Examiner*—Kathryn L. Gorgos
*Assistant Examiner*—Kishor Mayekar
*Attorney, Agent, or Firm*—John Forrest; Jacob Shuster

[57] ABSTRACT

The burning of material, including fuel and/or waste products, is performed within an incineration chamber heated above room-temperature while being supplied with high-power microwave radiation under conditions generating a plasma through which oxidation is enhanced to eliminate contaminants from the gaseous emission discharged from the incineration chamber.

9 Claims, 1 Drawing Sheet

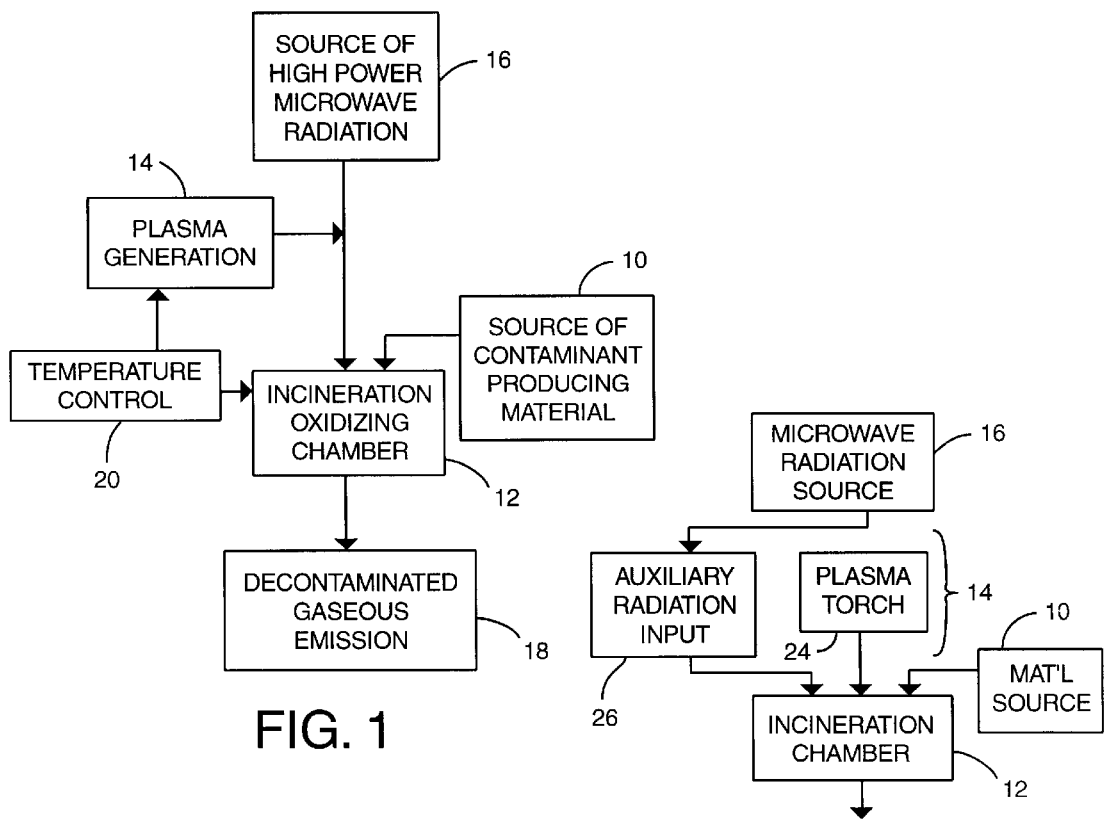
FIG. 1
FIG. 2A
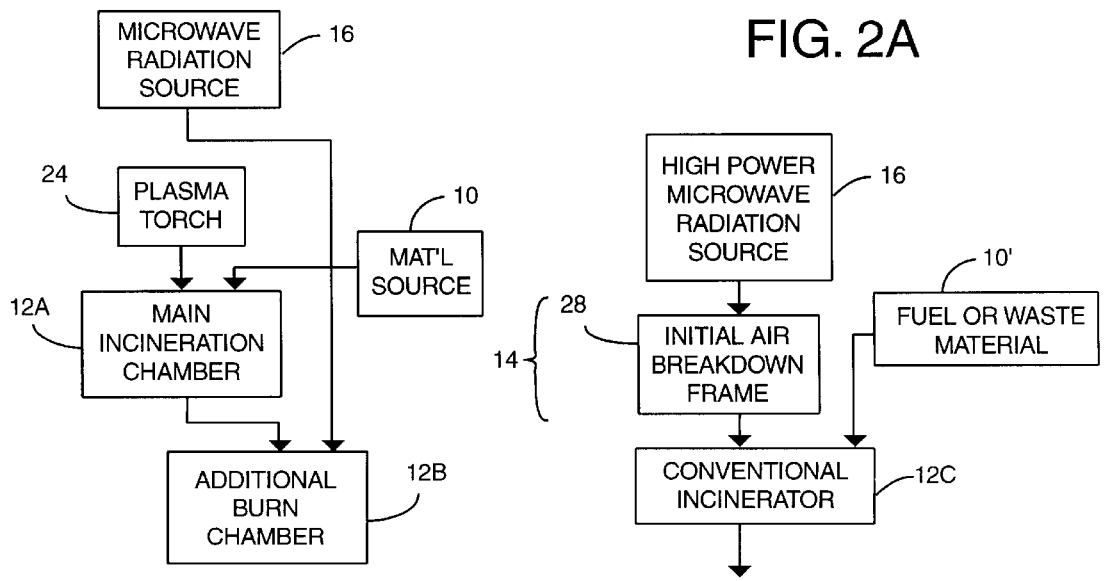
FIG. 2B
FIG. 2C

CONTAMINATION CONTROL OF EMISSION DISCHARGE

This invention relates generally to the elimination of contaminants in a gaseous emission by its exposure to microwave generated plasma.

BACKGROUND OF THE INVENTION

Despite current improvements in the incineration of materials, including fuel and waste products, the discharge of gaseous emission from conventional hot incinerators remains a source of air pollution because such emission is a carrier of contaminants. Pollution control with respect to contaminated air as a carrier gas, was proposed in U.S. Pat. No. 5,468,356 to Uhm issued to the present inventor on Nov. 21, 1995. According to such Uhm patent, contaminated air is exposed to microwave generated plasma for oxidation by atomic oxygen without bulk heating within a simple cylindrical waveguide cavity under room temperature. Further, according to the Uhm patent such plasma is generated within the cavity by introduction of high-power microwave radiation passing through an electric field to achieve air purification despite a microwave coupling efficiency of less than 10 percent.

It is therefore an important object of the present invention to increase absorption of microwave radiation for elimination of contaminants in a carrier gas by exposure to plasma generated with improved microwave coupling efficiency.

An additional object is to overcome difficulties heretofore experienced in achieving initial air breakdown by plasma ignition for oxidation of contaminants in a carrier gas.

SUMMARY OF THE INVENTION

In accordance with the present invention, the generation of microwave plasma through which atomic oxygen is obtained for enhanced oxidation of contaminants is adapted to a hot incinerator environment so as to achieve the aforementioned objectives of improving microwave coupling efficiency and eliminate any air breakdown problem, resulting in a more widely useful contamination control method. Thus, high-power microwave radiation is directly fed to a hot incineration chamber within which material is being burned to discharge a gaseous emission. The microwave radiation is conducted through an electric field for generation of plasma having an electron temperature maintained much higher than room-temperature energy level within the incineration chamber. The material while being burned is exposed to such plasma for enhanced oxidation of the contaminants by atomic oxygen.

BRIEF DESCRIPTION DRAWING FIGURES

A more complete appreciation of the invention and many of its attendant advantages will be readily appreciated as the same becomes better understood by reference to the following detailed description when considered in connection with the accompanying drawing wherein:

FIG. 1 is a block diagram illustrating the method of the present invention; and

FIGS. 2A, 2B and 2C are block diagrams respectively illustrating different embodiments of the method generally represented in FIG. 1.

DETAILED DESCRIPTION OF PREFERRED EMBODIMENTS

Referring now to the drawing in detail, FIG. 1 diagrams the system of the present invention wherein the burning of material from source 10 is performed within an incineration chamber 12 by oxidation during exposure to plasma. Generation of the plasma denoted in FIG. 1 by reference numeral 14 occurs during injection of high-power microwave radiation from source 16 directly into the chamber 12 through an electric field in accordance with principles set forth in U.S. Pat. No. 5,468,356 to Uhm. Pursuant to the present invention, the contaminants heretofore produced by oxidation of material from source 10 are eliminated from emission 18 because of temperature control 20 associated with plasma generation 14 increasing the electron energy temperature (Te) of the plasma to which the material is exposed while being heated to an elevated gas temperature (T) within the chamber 12 having a volume (V). The foregoing referred to parameters of electron temperature (Te), chamber gas temperature (T) and chamber volume (V) are factors responsible for decontamination of the gaseous emission 18 discharged from the incineration chamber 12 at room temperature (Tr).

As explained in U.S. Pat. No. 5,468,356 to Uhm, there is a threshold value (E) for the electric field at which air breakdown occurs. It is generally known in the art that microwave breakdown of a gas may be expressed as $$E = 30\, n, \tag{1}$$

where (n) is the gas molecule density number which is $3.3 \times 10^{16}$ particles per cubic centimeter for air and (E) is in units of volt/cm. In such electric field the electron collision frequency is much higher than the microwave frequency (w). The microwave power (P) required for gas breakdown within the electric field cavity having a radius (R) and axial length (d) may be estimated from the expression:

$$P = 900 \frac{\omega}{Q}\, \frac{n^2}{4}\, R^2 d \tag{2}$$

where (Q) is the classical electrodynamic value. According to the latter expression (2), the power (P) required for air breakdown is drastically reduced as its density decreases.

According to the simple ideal gas law, $$pV = nkT, \tag{3}$$

where (p) is pressure within the chamber 12 and (k) is a constant. Based on a constant pressure (p) during the material burning process within chamber 12, the microwave power (P) required for gas breakdown is expressed as:

$$P = \frac{wd}{Q} \left( \frac{15pVR}{k} \right)^2 \frac{1}{T^2}. \tag{4}$$

It is evident from the foregoing that the required microwave power (P) for air breakdown decreases drastically as chamber temperature (T) increases so that plasma generation 14 within the heated chamber 12 is much easier than generation within a cold chamber.

Once gas breakdown within chamber 12 of volume (V) is initiated by plasma exposure, the average electron energy (Te) in units of ev may be determined from the expression:

$$Te = 0.91 + 0.03\, E/n, \tag{5}$$

signifying that the electron energy (Te) increases as gas density (n) within chamber 12 decreases for a specified electric field (E). Therefore, because of the dissociative recombination process associated with an oxygen plasma as described in U.S. Pat. No. 5,468,356 to Uhm, plasma generation 14 by the high-power microwave radiation from source 16 introduced into the hot incinerator chamber 12 results in an abundance of atomic oxygen for efficient burning of any kind of material pursuant to the present invention.

According to one embodiment of the invention, a hot chamber gas temperature of T=3000° K as compared to the surrounding room temperature (Tr) of 300° K was established by heating under temperature control 20. The resulting electron energy temperature (Te) for the plasma in chamber 12 after gas breakdown was estimated to be Te=1.3 eV, as compared to that of 1 eV for a room temperature chamber. Increases in plasma density and atomic oxygen density by factors of 10 was accordingly achieved within chamber 12. Because of a large volume (V) of the chamber 12, one order larger in magnitude than the typical wavelength of 10 cm for the microwave radiation from source 16, complete absorption of the incoming microwave radiation was achieved to avoid the low microwave coupling efficiency heretofore experienced.

Microwave radiation at a high power level up to 60 kW from source 16 is directly applied to the hot chamber 12 to obtain electron and gas temperatures (Te) and (T) in order to improve microwave coupling and enhance generation of the plasma to which the gas is exposed within a chamber 12. The volume (V) of the chamber 12 is significantly larger than the radiation wavelength for efficient microwave absorption. The generation of plasma according to one embodiment as diagrammed in FIG. 2A, involves use of a plasma torch 24 through which plasma is delivered to chamber 12 at a nozzle temperature above 3000° K and a plasma electron density above $10^{17}/cm^3$. An auxiliary microwave input 26 supplies microwave radiation directly to chamber 12 from source 16 under power that is a small percentage of the electrical power from torch 24. The auxiliary radiation input 26 produces plasma upon entry into chamber 12 initiated by plasma electrons from the torch 24 resulting in a most uniformly distributed atomic oxygen density.

According to the embodiment diagrammed in FIG. 2B, the plasma is generated by torch 24 and fed to a main incineration chamber 12A from which emission discharge is fed to an additional burn chamber 12B to which microwave radiation is also applied. Further burning is performed within the additional chamber 12B in order to eliminate any remaining contaminants produced during initial burn in chamber 12A so as to insure satisfaction of certain environmental requirements. Such further burn in chamber 12B is associated with supply thereto of the microwave radiation from source 16 as well as the plasma accompanying the emission received from the main incineration chamber 12A.

FIG. 2C diagrams yet another embodiment wherein fuel or waste material from a source 10' is burned within a conventional type of incinerator 12C at a typical temperature above 1200° K, assisted by supply of microwave radiation thereto from source 16 to generate an air breakdown producing plasma for enhanced oxidation by atomic oxygen. An initial air breakdown frame 28 may be provided for introducing a sprinkling of salt powder to chamber 12C to temporarily obtain a relatively high plasma concentration for initial air breakdown purposes.

Obviously, other modifications and variations of the present invention may be possible in light of the foregoing teachings. It is therefore to be understood that within the scope of the appended claims the invention may be practiced otherwise than as specifically described.

What is claimed is:

1. In a method of oxidizing contaminants in a gaseous emission within a chamber having material therein by reaction of the contaminants with atomic oxygen produced as a result of dissociative recombination within plasma to which the gaseous emission is exposed, including the step of: injecting microwave radiation into the chamber through an electric field to generate the plasma therein having an electron temperature substantially above an energy level of 1 eV to heat the contaminants by incineration of the material within the chamber from which the gaseous emission with the contaminants therein is discharged.

2. The method as defined in claim 1 wherein said incinerating includes: burning the material to a chamber temperature above 3000° K.

3. A method of eliminating contaminants within a gaseous emission discharged from an incineration chamber within which burning of material is performed substantially above room temperature to produce said gaseous emission, including the steps of: injecting microwave radiation through an electric field into said incineration chamber during said burning of the material to generate a plasma; and exposing the material during said burning thereof to said plasma within the incineration chamber for enhanced oxidation of the contaminants by reaction with atomic oxygen produced as a result of dissociative recombination within the plasma.

4. The method as defined in claim 3 wherein said material is a fuel or a waste product.

5. A method of eliminating contaminants within a gaseous emission formed by incineration of material, comprising the steps of: introducing microwave energy through an electric field to generate a plasma; exposing the material to said plasma while undergoing said incineration; and increasing electron temperature of the plasma for enhanced oxidation of the contaminants by reaction with atomic oxygen produced as result of dissociative recombination within the plasma during said exposing of the material to the plasma while undergoing said incineration.

6. The method as defined in claim 5 wherein said step of increasing the electron temperature of the plasma produces an energy level therein substantially above 1 eV to achieve said enhanced oxidation of the contaminants.

7. The method as defined in claim 5 wherein said step of introducing the microwave energy includes the step of: supplying the microwave energy from at least two separate sources.

8. The method as defined in claim 7 wherein the microwave energy from one of said separate sources is introduced at a temperature above 3000° K to one chamber within which the incineration of the material is performed.

9. The method as defined in claim 7 including the step of: introducing the microwave energy from said two separate sources, respectively to separate chambers within which said incineration of the material is performed in sequence.

* * * * *